(12) United States Patent
Chuang et al.

(10) Patent No.: US 9,239,933 B2
(45) Date of Patent: Jan. 19, 2016

(54) PIRACY PREVENTION AND USAGE CONTROL SYSTEM USING ACCESS-CONTROLLED ENCRYPTED DATA CONTAINERS

(71) Applicants: Richard Chuang, Sunnyvale, CA (US); David Franklin DeBry, Salt Lake City, UT (US)

(72) Inventors: Richard Chuang, Sunnyvale, CA (US); David Franklin DeBry, Salt Lake City, UT (US)

( * ) Notice: Subject to any disclaimer, the term of this patent is extended or adjusted under 35 U.S.C. 154(b) by 0 days.

(21) Appl. No.: 14/306,201

(22) Filed: Jun. 16, 2014

(65) Prior Publication Data

US 2014/0372771 A1 Dec. 18, 2014

Related U.S. Application Data

(60) Provisional application No. 61/835,045, filed on Jun. 14, 2013.

(51) Int. Cl.
*G06F 21/10* (2013.01)
*G06F 21/62* (2013.01)
*H04L 29/06* (2006.01)

(52) U.S. Cl.
CPC ............ *G06F 21/6209* (2013.01); *G06F 21/10* (2013.01); *H04L 63/0428* (2013.01)

(58) Field of Classification Search
CPC .. H04L 2209/60; H04L 63/0428; G06F 21/10
USPC ................................................. 713/165, 189
See application file for complete search history.

(56) References Cited

U.S. PATENT DOCUMENTS

| | | | | |
|---|---|---|---|---|
| 5,933,826 | A * | 8/1999 | Ferguson | G06F 21/31 |
| 7,096,504 | B1 * | 8/2006 | Tagawa et al. | 726/27 |
| 7,464,269 | B2 * | 12/2008 | Johnson | G06F 21/10 713/176 |
| 8,751,798 | B2 * | 6/2014 | Ayars et al. | 713/165 |
| 2003/0131353 | A1 * | 7/2003 | Blom | H04L 63/0428 725/25 |
| 2003/0200459 | A1 * | 10/2003 | Seeman | G06F 21/10 726/26 |
| 2003/0225701 | A1 * | 12/2003 | Lee | G06F 21/10 705/57 |
| 2007/0100701 | A1 * | 5/2007 | Boccon-Gibod | G06F 21/10 705/21 |
| 2008/0010458 | A1 * | 1/2008 | Holtzman | H04L 63/0823 713/175 |
| 2008/0010685 | A1 * | 1/2008 | Holtzman | G06F 12/1483 726/27 |
| 2013/0238808 | A1 | 9/2013 | Hallem et al. | |
| 2014/0006347 | A1 | 1/2014 | Qureshi et al. | |

OTHER PUBLICATIONS

Solid File System, "SolFSStorage class," downloaded from www.eldos.com on Jul. 11, 2014, 6 pages.

(Continued)

(Continued)

*Primary Examiner* — Dao Ho
(74) *Attorney, Agent, or Firm* — San Diego IP Law Group LLP (57) ABSTRACT

This is a system for controlling and restricting access (reading, writing, creating, deleting, manipulating, and control) to data and data representations of arbitrary processing engines through the use of secure containers, an access processing engine, and cryptographic keys.

17 Claims, 8 Drawing Sheets

(56) References Cited

OTHER PUBLICATIONS

Solid File System, "SolFSStorage.AddGrantedProcess method," downloaded from www.eldos.com on Jul. 11, 2014, 4 pages.
Solid File System, "SolFSStorage.DeleteGrantedProcess method," downloaded from www.eldos.com on Jul. 11, 2014, 2 pages.
Solid File System, "SolFSStorage.GetAccessDeniedProcess method," downloaded from www.eldos.com on Jul. 11, 2014, 3 pages.
Solid File System, "SolFSStorage.GetAccessGrantedProcess method," downloaded from www.eldos.com on Jul. 11, 2014, 3 pages.
Solid File System, "SolFSStorage.GetAccessGrantedProcessCount method," downloaded from www.eldos.com on Jul. 11, 2014, 2 pages.
Solid File System, "SolFSStorage.ProcessRestrictionsEnabled property," downloaded from www.eldos.com on Jul. 11, 2014, 2 pages.

* cited by examiner

PIRACY PREVENTION AND USAGE CONTROL SYSTEM USING ACCESS-CONTROLLED ENCRYPTED DATA CONTAINERS

CROSS-REFERENCE TO RELATED APPLICATIONS

This application claims priority under 35 U.S.C. §119 to U.S. Provisional Patent Application Ser. No. 61/835,045 entitled, "Piracy Prevention and Usage Control System Using Access-Controlled Encrypted Data Containers," filed Jun. 14, 2013, the disclosure of which is incorporated herein by reference in its entirety as if set forth in full.

BACKGROUND OF THE INVENTION

1. Field of Invention

The present invention is in the technical field of electronic security. More particularly, the present invention is in the technical field of prevention of data piracy and usage control of software.

2. Description of Related Art

Piracy of software and media is an on-going battle. Piracy costs software developers and content providers millions of dollars a year. In addition, there are many applications where it is desirable to allow resources to be accessed by a user, while preventing the user from copying the resources; for example, when communicating proprietary information.

SUMMARY OF THE INVENTION

Systems and methods for preventing data piracy and software usage control via access-controlled encrypted data containers are shown and described.

In an embodiment of the invention, a user device comprises: a secure container comprising program instructions, wherein the program instructions are secured in the secure container through one or more cryptographic keys; and an access processing engine, wherein the access processing engine controls access to the secure container and launches the program instructions in accordance with rules received from a rules management engine. The secure container further comprises data, and the access processing engine grants the launched program instructions permission to access the data. The program instructions are identified by a process identification number or a process handle. The rules management engine is remote from the user device. The one or more cryptographic keys are received from a key management engine, wherein the key management engine is remote from the user device. The program instructions do not include a copy prevention module. The access processing engines grants a child process spawned by the launched program instructions permission to access the data. The data comprises protected media and the launched program instructions comprise a media player. The media player can watermark the protected media when played. Alternatively, the data comprises a document and the launched program instructions comprise a document viewer.

In another embodiment of the invention, a method of piracy prevention and usage control is implemented on a user device, and comprises the steps of: receiving, at the user device, program instructions; storing, at the user device, the program instructions in a secure container; receiving, at the user device, rules received from a rules management engine; determining, at the user device, whether the rules grant permission to launch the program instructions; and launching, at the user device, the program instructions if permission is granted. The secure container further comprises data, and the method further comprises the step of granting the launched program instructions permission to access the data. The method further comprises the steps of: receiving one or more cryptographic keys from a key management engine; encrypting the program instructions with the one or more cryptographic keys; and wherein the step of launching comprises the step of decrypting the program instructions with the one or more cryptographic keys. The program instructions do not include a copy prevention module. The data comprises protected media and the launched program instructions comprise a media player. The media player watermarks the protected media when played. Alternatively, the data comprises a document and the launched program instructions comprise a document viewer.

The foregoing, and other features and advantages of the invention, will be apparent from the following, more particular description of the preferred embodiments of the invention, the accompanying drawings, and the claims.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF EMBODIMENTS

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

In this disclosure, the term "organized data" is used to describe any form of data that has meaningful structure to the end user or the system. Examples of organized data include program instructions; media content such as, but not limited to displayable media (movies, images, pictures, etc.) or music; documents such as, but not limited to text files, Acrobat files, source code files; or more generically data files of any sort. Program instructions are sometimes known in the art as a "binary executable," "binary code," or simply as an "executable" or even simply as an "app" or "application." The program instructions are operable to cause a machine, such as hardware or even a virtual machine, to perform an arbitrary process, i.e., "arbitrary processing engine." In this disclosure, the term "program instructions" is intended to represent a specific type of organized data that can be instantiated to cause a machine to perform arbitrary processes. When not stated otherwise, "organized data" is intended to encompass any form of organized data.

Figure 1:
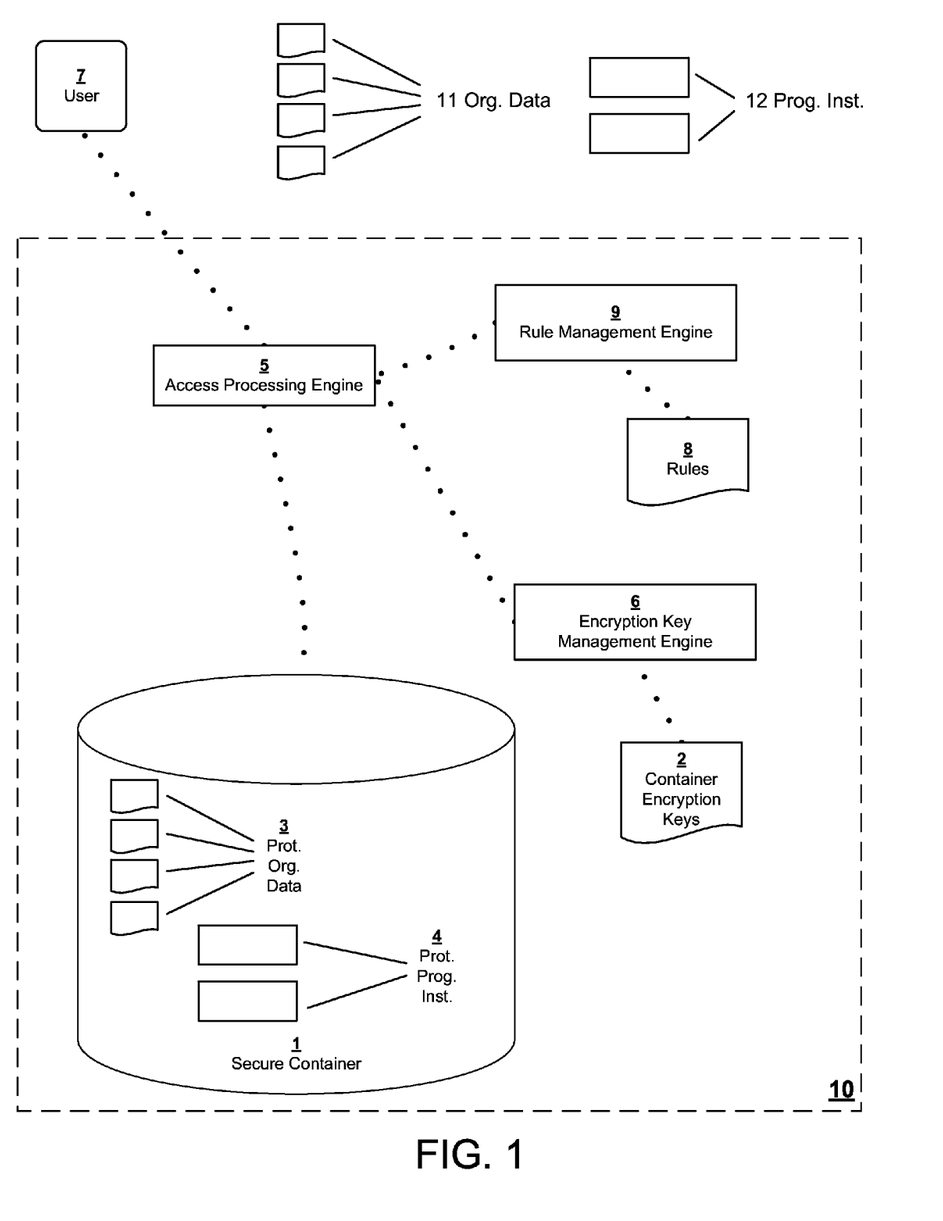
FIG. 1 depicts a piracy prevention and usage control system.

FIG. 1 depicts a piracy prevention and usage control system (10) according to an embodiment of the invention. This system (10) comprises a secure container (1) of organized data (3 and/or 4). The secure container is encrypted such that the data within is only accessible with one or more proper container cryptographic keys (2), the identification and implementation of which are apparent to one of ordinary skill in the art. Though described as a single container in FIG. 1, it should be understood that the secure container (1) can be several secured or encrypted storage containers with one or more cryptographic keys. For the purposes of discussion, multiple containers are referred to collectively as a "secure container" (1). The individual elements of data (3, 4) are organized in the secure container in such a way that, given the proper container cryptographic keys, the individual elements of data can be referenced and accessed individually or in groups. The data within the container and the organization of that data may change over the lifetime of the secure container. For the sake of example, two exemplary forms of organized data are shown. Depicted is protected content (3) which can be any type of data that is to be protected from copying and program instructions (4) which is data operable to implement a process to perform a desired function, such as that described in the preceding paragraph. However, the system (10) may comprise one or the other, or both.

The system can further comprise an access processing engine (5), a cryptographic key management engine (6), and a rules management engine (9). The system (10) can optionally also access unprotected organized data (11). Additionally, it can optionally allow access by processes instantiated from unprotected program instructions (12). Examples of the potential interrelationship between unprotected organized data (11), unprotected program instructions (12), and the system (10) are given below.

The access processing engine (5) manages and controls access to the contents of secure container (1). It should be noted that access to the contents of the secure container (1) is completely controlled by access processing engine (5) and that access processing engine (5) can allow (i.e., grant permission to) some processes to access the secure container (1) while denying access to others. When the processes are embodied in software, the access processing engine (5) can restrict access to the secure container (1) by setting rules based on process identification numbers (IDs) or process handles, the implementation of which is apparent to one of ordinary skill in the art. The rules can also be based on process names, process location, or location of the program instructions which instantiated the process. Furthermore, in many operating systems, processes can spawn child processes. In those operating systems, the access processing engine (5) can place allowance based on the process identifiers or process handles of a process and its ancestors. For example, access processing engine (5) grants permission to a process or any child process of that process access to the secure container (1). In addition, access can also be granted to groups of processes identified by process groups.

The access processing engine (5) is not limited to either fully declining access or fully rejecting access to the contents of the secure container. The access processing engine may grant or deny access to various aspects of the contents of the secure container individually: separate elements of data, the list of contents of the container, the organization of the container, process control of the program instructions within the container, and so forth.

The access processing engine (5) uses container cryptographic keys (2) for gaining access to the data container. The access processing engine (5) is also aware of the organization of data within the container, such that the engine can access individual elements of data (3,4) within the container, or groups of individual elements. Access control and storage of the cryptographic keys (2) is managed by the cryptographic key management engine (6). In one embodiment, the cryptographic keys (2) are stored in the cryptographic key management engine (6) (as depicted in FIG. 1). In another embodiment, the cryptographic keys (2) are stored external to the system (10) and the cryptographic key management system (6) is responsible for the retrieval of the cryptographic keys (2) as they are needed by the system (10). The access processing engine (5) can retrieve the cryptographic keys as needed and as authorized by the key management engine. It should be noted that the users (7) do not have direct access to the container cryptographic keys (2). As a result, the users must use the access processing engine (5) to access anything held within a secure container.

The rules management engine (9) directs the access processing engine (5) as to the circumstances to which access is to be provided. The rules management engine (9) makes access decisions based on a set of rules (8). As an example, these rules can be a simple access control list where authorized and authenticated users can be granted to protected organized data (3, 4). In another example, licensing rules can be used, where usage is metered, and access is granted based on whether a user has exceeded the allocated licensed usage. Furthermore, rules can dictate the type of access that is permitted, e.g., read, write, delete, execute, etc.

Program instructions are shown as either protected (4) or unprotected (12). These program instructions—if protected—reside within a secure container (1) where the access to the execution of the program instructions is also controlled by the access processing engine (5). Alternatively, the program instructions may not be protected, in which case they reside outside the secure container (1) and the execution of the program instructions need not be controlled by the system (1). The process instantiated by the execution of the program instructions (i.e., the process launched from the instructions) can create, delete read, write, manipulate, and/or control other data held inside (e.g., protected content (3)) or outside a secure container (e.g., organized data (11)).

The access processing engine (5) makes its decisions concerning which users have access to which aspects of the secure container via a set of rules (8). These rules may be held by the access processing engine, or they may be given to the access processing engine from a rule management engine (9). In either case, the rules governing access to a secure container may change over the lifetime of the secure container.

The program instructions (4, 12) may be instantiated multiple times and be launched as multiple processes. These multiple processes may be run simultaneously. The rules (8) may take advantage of this environment, and grant one instantiation of the program instructions access to data within the secure container while another instantiation of the program instructions is denied access.

In one embodiment, a user (7) may not be granted direct access to the data within a secure container, or to read the program instructions (4) within a secure container (1), but the user may be granted control of the program instructions (4) within a secure container (1), i.e., be able to execute the program instructions (4). Further note that the process instantiated from the protected program instructions (4) may itself have been granted access to other data (3, 4) within a secure container. This results in the user gaining limited access to the data within a container, in that the user may only access the data within the limitations of the protected program instructions. This restriction effectively allows for access to be limited based on the reason the user has for accessing the data within the secure container.

The users (7) may be people, or other programs, systems or processes that may reside outside of the secure container, (1) or a process launched from protected program instructions (4) residing within a secure container (1). The access processing engine may grant or decline access to users of the engine when the access processing engine is asked to retrieve data from the container.

As a specific example, when the system (10) is employed to protect a movie, access processing engine (5) could allow a movie player process, possibly identified by a process ID to access a protected movie as an example of protected content (3). This movie player process might have special features, such as a watermarking feature which embeds a visible or invisible watermark into the movie being view so if the movie were copied by hacking or screen grabbing. The watermark will indicate the origin of the unauthorized copy. The access processing engine (5) would deny access to the movie for any other player. In effect, the protected movie can only be played by the specially designated movie player. In one variation, the movie player can be represented as protected program instructions (an example of program instructions (3)) or as an example of unprotected program instructions (12)).

In another specific example, system (10) could be employed to protect sensitive documents and access processing engine (5) could allow specialized document viewers to access protected documents such as, but not limited proprietary source code or technical information. This specialized viewer could restrict the ability to print, edit and copy the documents, but could permit viewing and searching. The access processing engine (5) would deny access to any other process such as a generic text editor. This would prevent unauthorized copying and printing of the protected documents. As before the specialized document viewer(s) could be represented by program instructions either as protected or unprotected.

In another specific example, system (10) could be employed to protect an application, access processing engine (5) based on licensing criteria could allow a specific set of program instructions (an example of program instructions (4)) to be instantiated into a process (i.e., "launched"). For example, the program instructions could be the "executable" for an image rendering program. The rendering program may need to access protected assets (an example of protected content (3)) that may be provided by a film studio and access to unprotected assets (an example of organized data (11)) provided by the artist end user. Access processing engine (5) in this example would only allow the rendering program to be launched if license conditions were met and can only allow the rendering program to access the protected assets and no other programs. Furthermore, the access could be metered and access could be denied and/or current sessions of the rendering program could be terminated when a given usage limit has been reached or when a license is revoked. Countless other license policies could be imposed. Access could be denied when usage limit has been reached, but current sessions could be permitted to continue to execute based on an allowed overuse policy and only when that policy has been exhausted is the program terminated.

System (10) could be encapsulated in a single device or components may be spread across several devices and servers coupled by a computer network. For example, access processing engine (5) along with secure container (1) could reside on an end user device such as a computer, tablet, or smartphone. The rule management engine (9) and cryptographic key management engine (6) could reside on a single server or separate servers. Furthermore, the rules (8) which can be implemented in a database or as a set of instructions, may reside on the same or different server from rule management engine (9) Likewise, computer cryptographic keys (2) which can reside in a database can reside on the same or different servers from cryptographic key management engine (6).

It should be noted that in the subsequent configuration, unprotected organized data (11) and unprotected program instructions (12) are not depicted.

Figure 2:
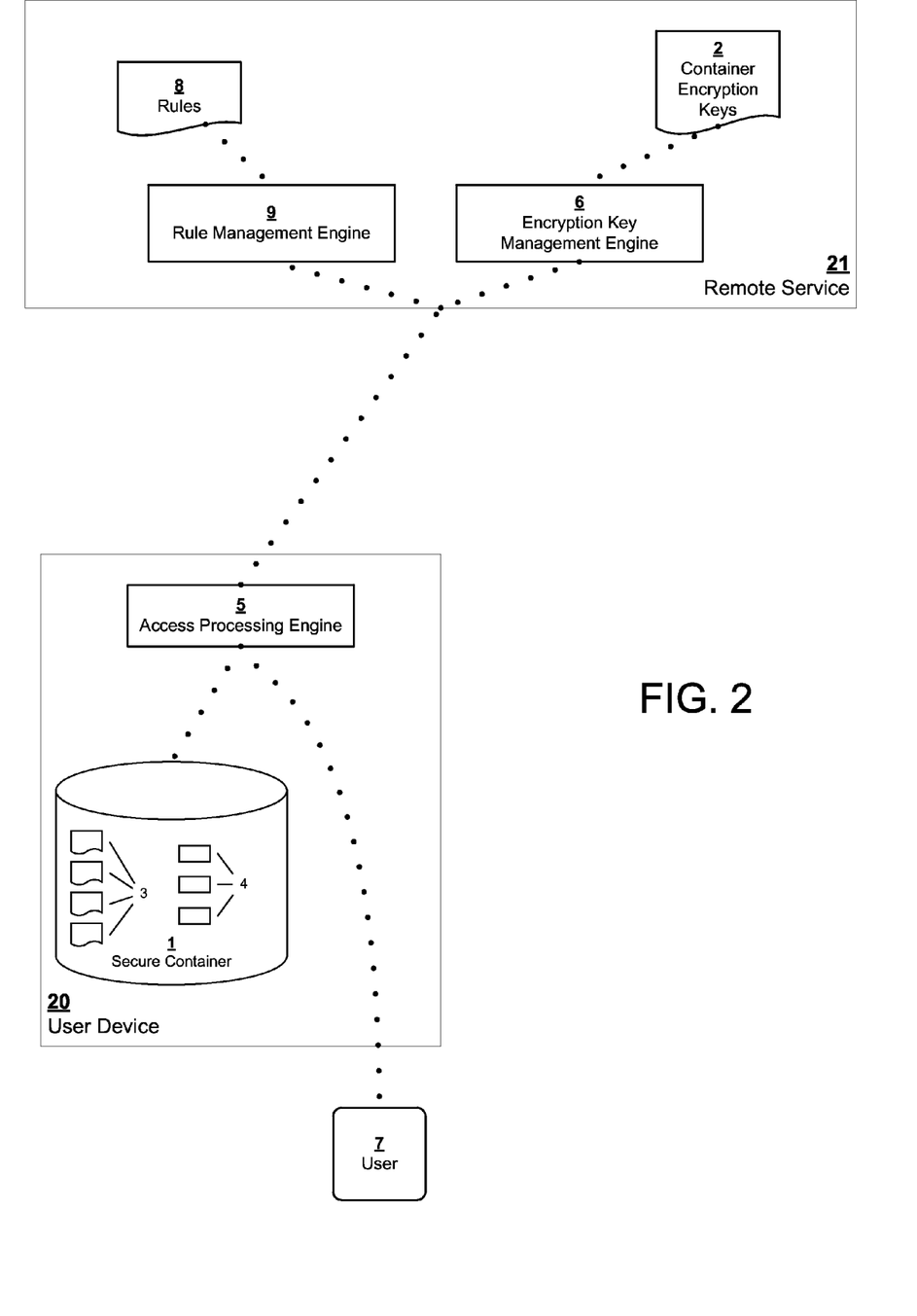
FIG. 2 depicts an exemplary implemented configuration of a piracy prevention and usage control system.

System (10) could be encapsulated in a single device or components may be spread across several devices and servers coupled by a computer network. FIG. 2 depicts an exemplary implemented configuration of system 10, where a user device (20) comprises access processing engine (5) along with secure container (1). Specific examples of user device (20) include but are not limited to a computer, tablet or smartphone. In addition, a remote service (21) comprises rules management engine (9) along with rules (8) and cryptographic key management engine (6) along with cryptographic keys (2). The implementation of the components of the remote service (21) can be a server or collection of servers. In the latter case, separate servers may comprise the rules management engine (9) and cryptographic key management engine (6). The rules (8) can be implemented in one or more databases or as a set of instructions and may reside on a server of its own or combined with the servers used for the rules management engine (9). The cryptographic keys (2) can be stored in a database and can reside on the same or different servers from cryptographic key management engine (6).

In the configuration of FIG. 2, access to the protected data (3, 4) is controlled by a remote service (21). This configuration can be used, for example, where a movie segment is offered for viewing for limited time to some individuals. The remote service is controlled by the content owner. If the content owner wishes to revoke access even before the limited time to certain individuals, they can. This enables the owner to change the terms of the license at any time.

Figure 3:
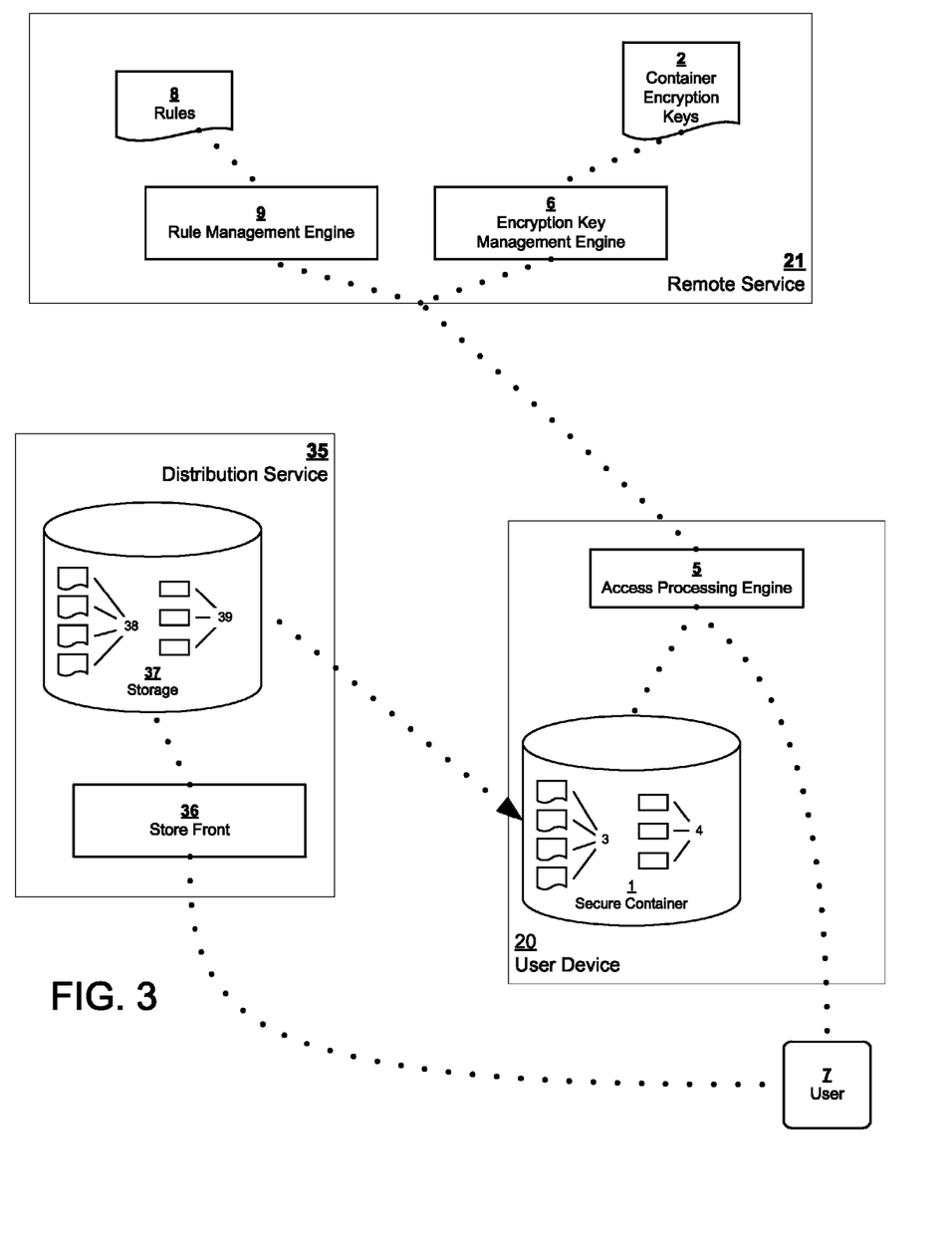
FIG. 3 depicts an exemplary implemented configuration of a piracy prevention and usage control system with the addition of a distribution service.

FIG. 3 depicts the system as shown in FIG. 2 with the addition of a distribution service. In addition to the components described in the user device (20) and the remote service (21), a distribution service (35) is included. Distribution service (35) comprises storage (37) where many protected collections of organized data (38, 39) are housed. Based on access rights, user device can download protected program data (i.e., an app) or other protected organized data (e.g., a movie, e-book, song, etc.) into the secure container (1). The data can be transmitted over a network using any type of protocol including, but not limited to Bittorrent, file transfer protocol (FTP) or secure FTP (SFTP), or one of the countless other protocols known now or later to one of ordinary skill in the art. The data as transmitted should be encrypted so that only the access processing engine is able to decrypt the data as it stores the data into the secure container (1). This prevents the protected data from being intercepted on the network or by the user (7). The distribution service (35) can further comprise a store front. The storefront can be an interface which allows the user (7) to purchase, lease, or otherwise license some unit of protected data (38, 39) in storage 37.

For example, a movie rental company could provide a warehouse of movies (such as protected data (38)). The user (7) can use a browser to access the storefront (36) which in this example is embodied as a business website. Upon selecting and purchasing a movie, the movie is downloaded directly into the secure container (1) by the access processing engine (5). Alternatively, the user could elect to rent a movie. The movie is downloaded just as in the case of a purchase, but the rules allow the user to only view the movie within the rental period. Thereafter, the access processing engine (5) would disallow access. In both cases, the access processing engine (5) may offer the user the option to delete the movie from the secure container (1) in order to save disk space.

Figure 4:
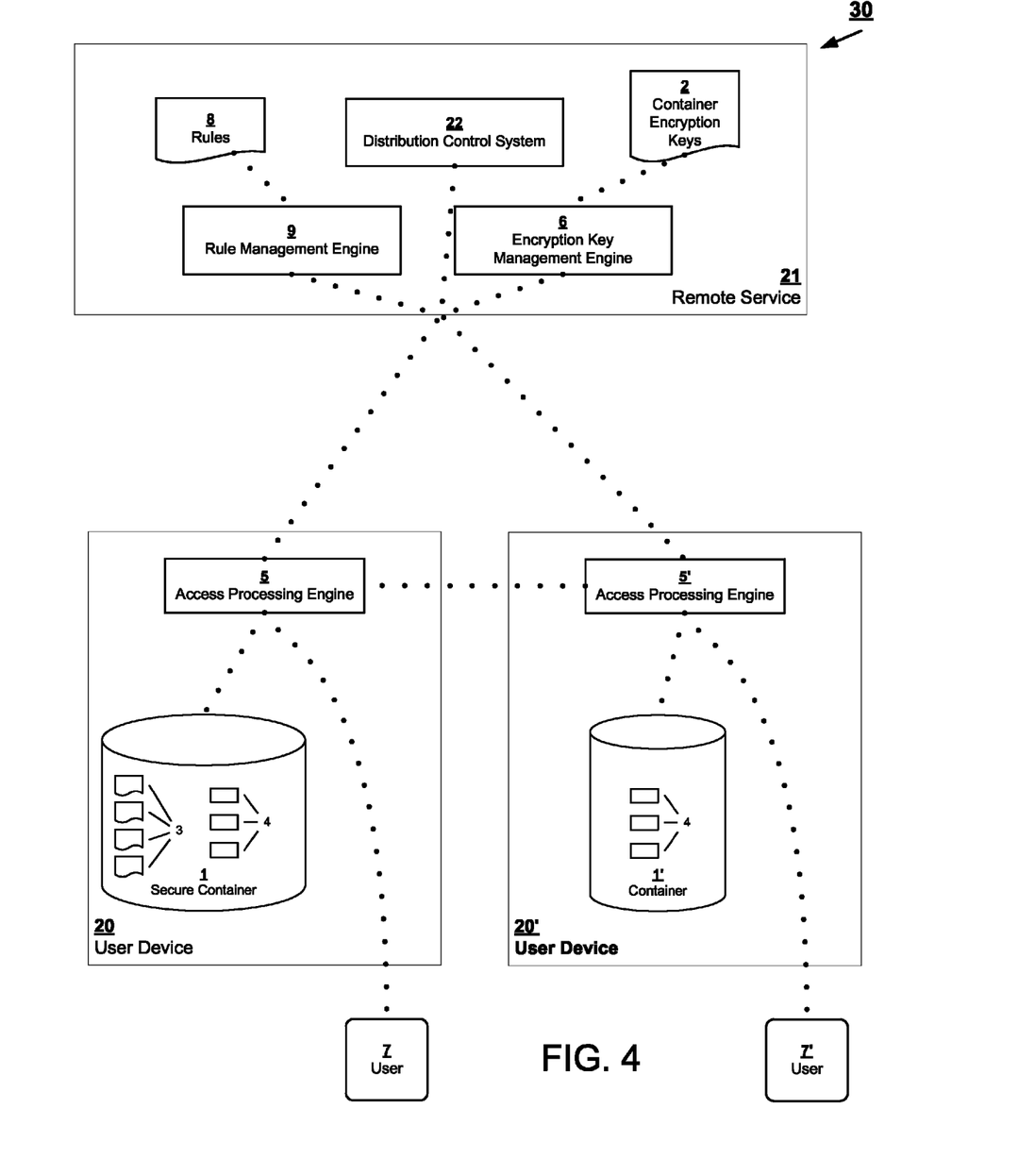
FIG. 4 depicts a piracy prevention, usage control and distribution system.

FIG. 4 depicts a piracy prevention, usage control and distribution system. In addition, a second user (7') known as the content owner can deposit into a container (1') on user device (20') protected program instructions (4). These program instructions could be run on a user device. It may also include content. For example, the program instructions could implement a movie playing app and a movie which is to be protected. In addition, the remote service (21) could also comprise a distribution control system (22). Distribution control system (22) determines whether the user (7) is permitted to receive data from the content owner (7'). If user (7) is permitted to receive the content from the content owner (7'), the protected program instructions are transferred from container (1') to secure container (1). The data can be transferred using a peer-to-peer protocol such as, but not limited to Bittorrent, a client server protocol such as FTP or SFTP, or one of the countless other protocols known now or later to one of ordinary skill in the art.

By allowing direct connection between user devices, especially using peer to peer protocol, the protected program instructions can be distributed efficiently. Furthermore, if the contents of container (1') and secure container (1) are continually mirrored, a content owner (7') could distribute new content or upgrades to user (7) by putting new data into container (1'). Additionally, access processing engine (5) can also write data into container (1) which is mirrored back to container (1'). This data can be used to track usage of protected data (3, 4). Furthermore, individual license information could be transmitted from content owner (7') into secure container (1) which can be read by access process engine (5) to limit the use of protected data (3, 4) based on the license information, such a limiting the usage of the protected data (3, 4) to a given amount of time, or limiting the number of concurrent instances of protected data (3, 4) to a preset limit. (An instance of non-program instructions could represent any kind of usage, for example, for a video file, an instance would be one application playing the movie, so the system could limit a movie for example, to only two concurrent showings.)

More specifically, access processing engine (5) can track usage by a user or can be configured with a group of users such as users on a specific project which can share in the allotted usage. Furthermore, access processing engine (5) can keep track of or limit the number of simultaneous instances of protected data (3, 4) and can count usage accordingly. For example, the content owner may allow simultaneous usage and only charge by absolute wall clock time or may charge for each instance so if a user or project runs two instances the usage number will increase at double the rate.

Furthermore, the access processing engine (5) can be equipped with process control, so that the protected data (3, 4) can be instantiated, terminated, and regulated without any modification to the protected data. In other words, when the protected data are protected program instructions (4), the protected program instructions do not have to be modified to take advantage of the usage licensing features.

In a complex system with many secure containers per device, the access processing engine along with a distribution control system (22) can be used for distributing software and data for a collaborative workflow system without exposing the contents of the proprietary workflow. The proprietary workflow could comprise software, particularly software under license, and data such as work product or content. For example, in a production pipeline, a workflow could comprise supplying assets to a rendering program to produced rendered output. It may be desirable to limit access to the assets, rendering program and to the rendered output.

In yet another embodiment of the invention, container (1') could be a secure container only accessible by the access processing engine (5'), so that user (7') could only add organized data to the container (1') by using the access processing engine (5'). This can be used to insure that the organized data is in a form usable to other user devices (e.g., user device 20) and to prevent user (7') from intentionally or inadvertently introducing a security threat. As an additional security measure, access processing engine (5') can scan the organized data for viruses.

It should be noted that in this distribution system the remote service (21) has no control over the actual licensing of the protected program instructions (4) nor does the remote service (21) have access to protected program instructions, since this control is between user device (20) and user device (20').

Another application of the system is in the control of confidential documents. As an example, in the field of law, adverse parties are often obligated to share documents containing highly sensitive information. Source code has been especially troublesome. For software companies, their source code is the entire value of their company. Protective orders often place burdensome restrictions on access to source code making it difficult for the adversarial party's representatives to properly review the code and often requiring them to travel to remote sites.

However, if the source code was placed into a content owner's container along with special reviewing applications that allowed search, tagging, Bates number and reviewing, the adversarial party's representatives can conveniently review the source code. Meanwhile, times of access and list of accessing users can be tracked and provided to the content owner. Furthermore, the content owner has the ability to remove users from the access list. After the case is resolved, the cryptographic keys can be deleted and the secure container on the reviewing system is rendered useless.

Figure 5:
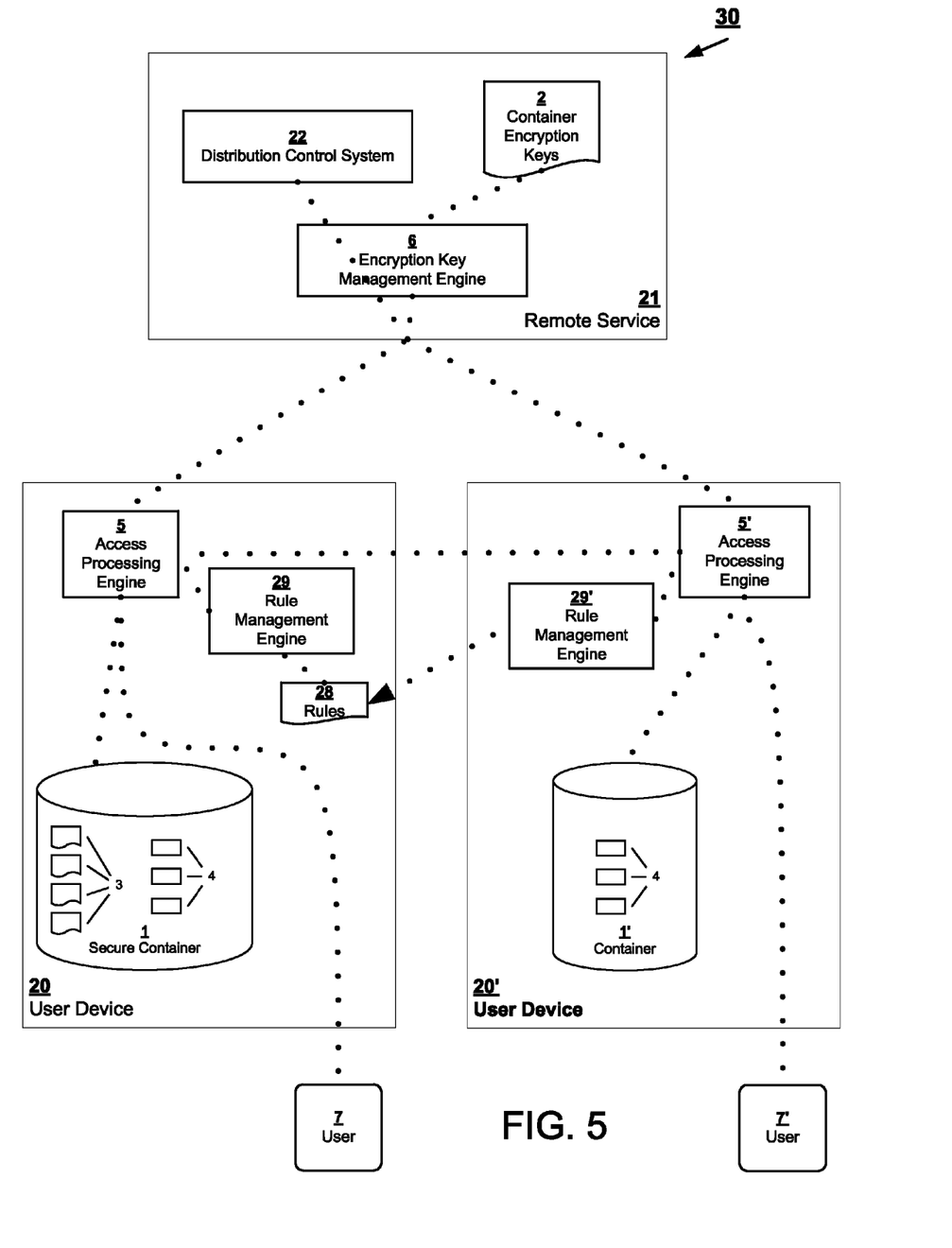
FIG. 5 depicts another embodiment of a piracy prevention, usage control, and distribution system.

FIG. 5 depicts another embodiment of a piracy prevention, usage control, and distribution system. In this embodiment as in the variation above, the access processing engine (5) meters the usage; however, a local version of the rules management engine (29) resides on the user device (20). Similarly, the second user device (20') also comprises a local version of the rules management engine (29'). The remote service may also retain a rules management engine, but does not necessarily need to be one. The second user (7') being the owner of some of the content in the secure container (1) can dictate and change the rules for that content. Unlike in the previous examples, the changes to rules is conveyed directly between user devices without the need to issue rules to a centralized rules management engine (such as remote management system 9 in FIG. 4) in the remote service (21).

Figure 6:
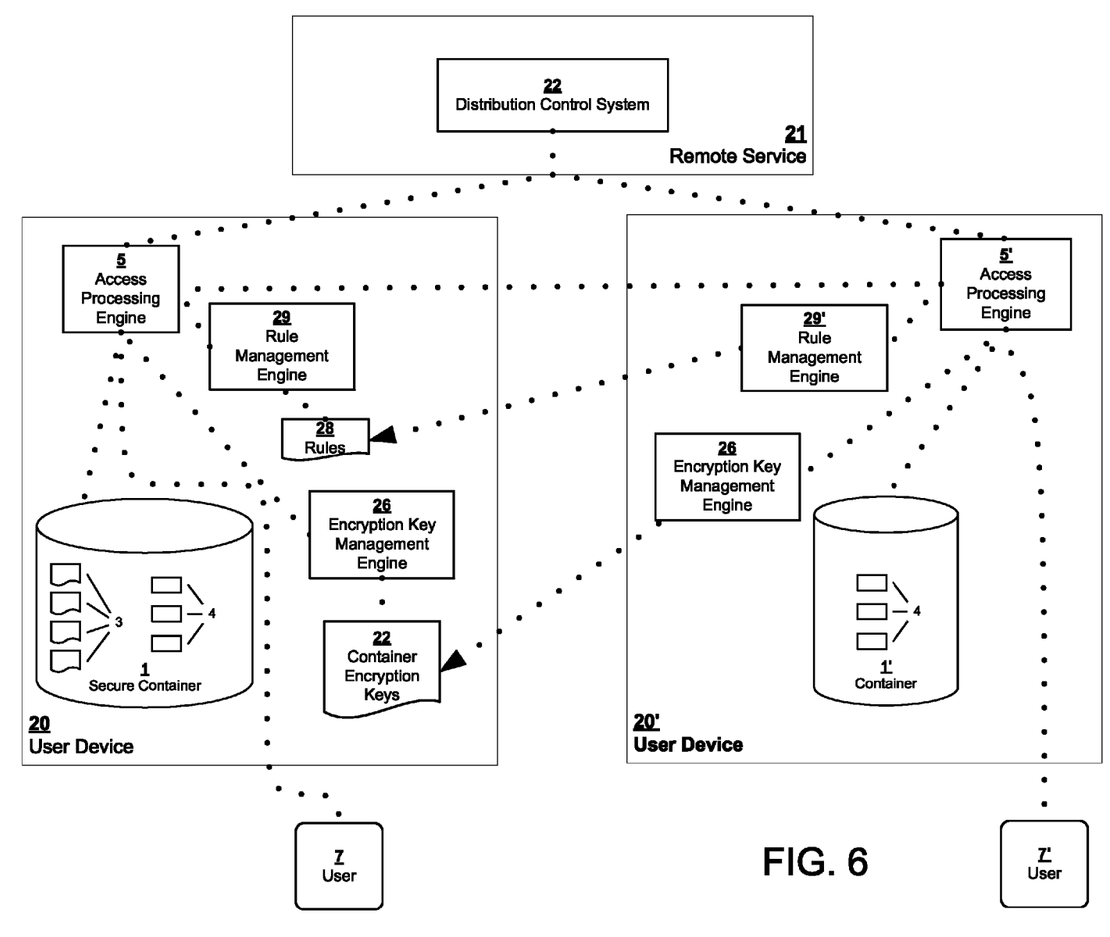
FIG. 6 depicts yet another embodiment of a piracy prevention, usage control, and distribution system.

FIG. 6 depicts another embodiment of a piracy prevention, usage control, and distribution system. Further decentralization of control takes place. In this embodiment, the cryptographic keys (22) to the secure container (1) or alternately cryptographic keys (22) necessary to decrypt some of or all of protected data (3,4) in the secure container (1) is provided by the content owner's user device (20'). The keys are managed by cryptographic key management engine (26') on the content owner's user device (20'). On the content user's user device (20), the cryptographic key management engine (26) receives the cryptographic key from the cryptographic key management engine (26'). In this fashion, the content would not be compromised even if the remote service (21) has been compromised.

Figure 7:
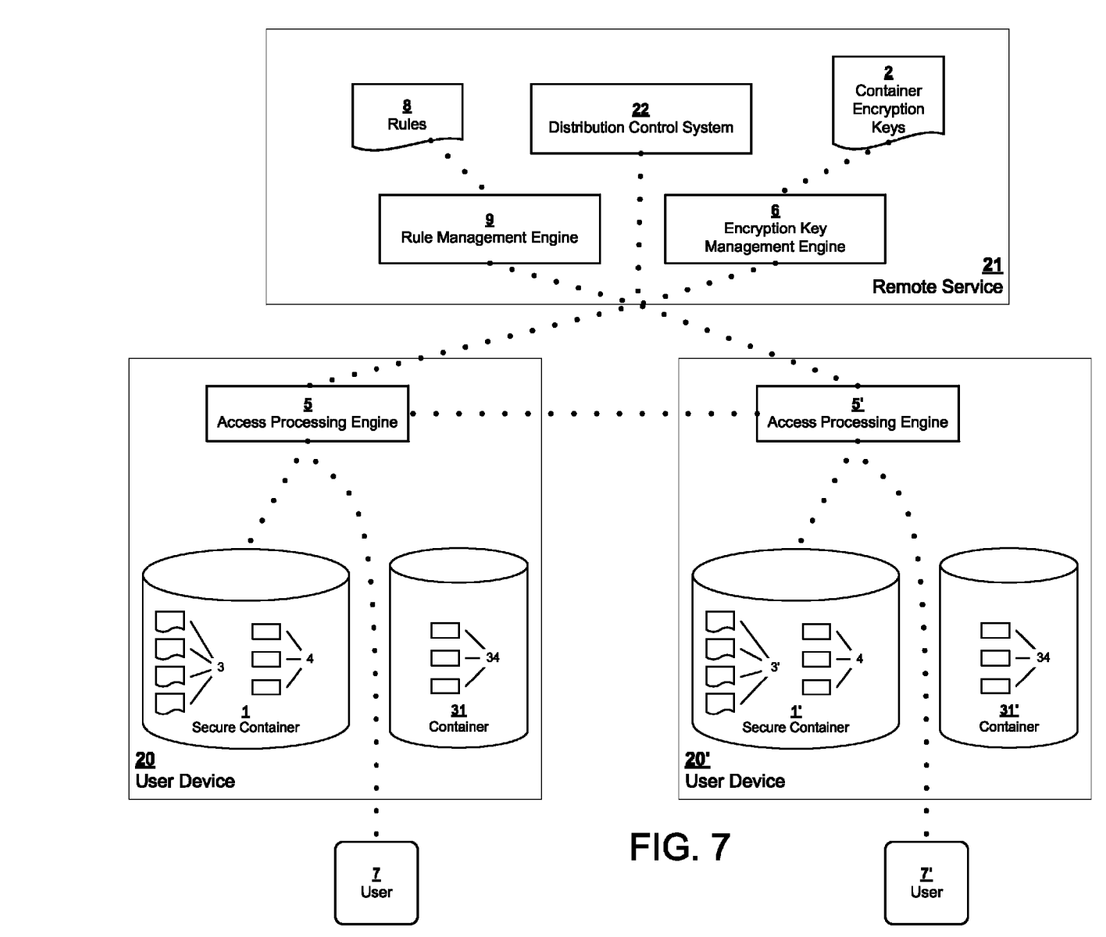
FIG. 7 depicts yet another embodiment of a piracy prevention, usage control, and distribution system.

FIG. 7 depicts another embodiment of a piracy prevention, usage control, and distribution system. In this example, both a first user (7) and second user (7') are content owners and content users. The user device (20) of the first user (7) comprises a second container (31) and user device (20') of the second user (7') comprises a second container (31') which is secured along with cryptographic keys (33) to control access to secure container (31'). As a content owner, a user (7) can distribute content by placing protected program instructions (34) is placed into container (31). It then can be transmitted to user device (7') and placed into secure container (31'). As a content user, user (7) can execute protected program instructions (4) that was received from user (7'). Likewise, user (7') can function as both a content owner and a content user. In one distribution model, secure container (1') mirrors container (31) and secure container (1) mirrors container (31').

Figure 8:
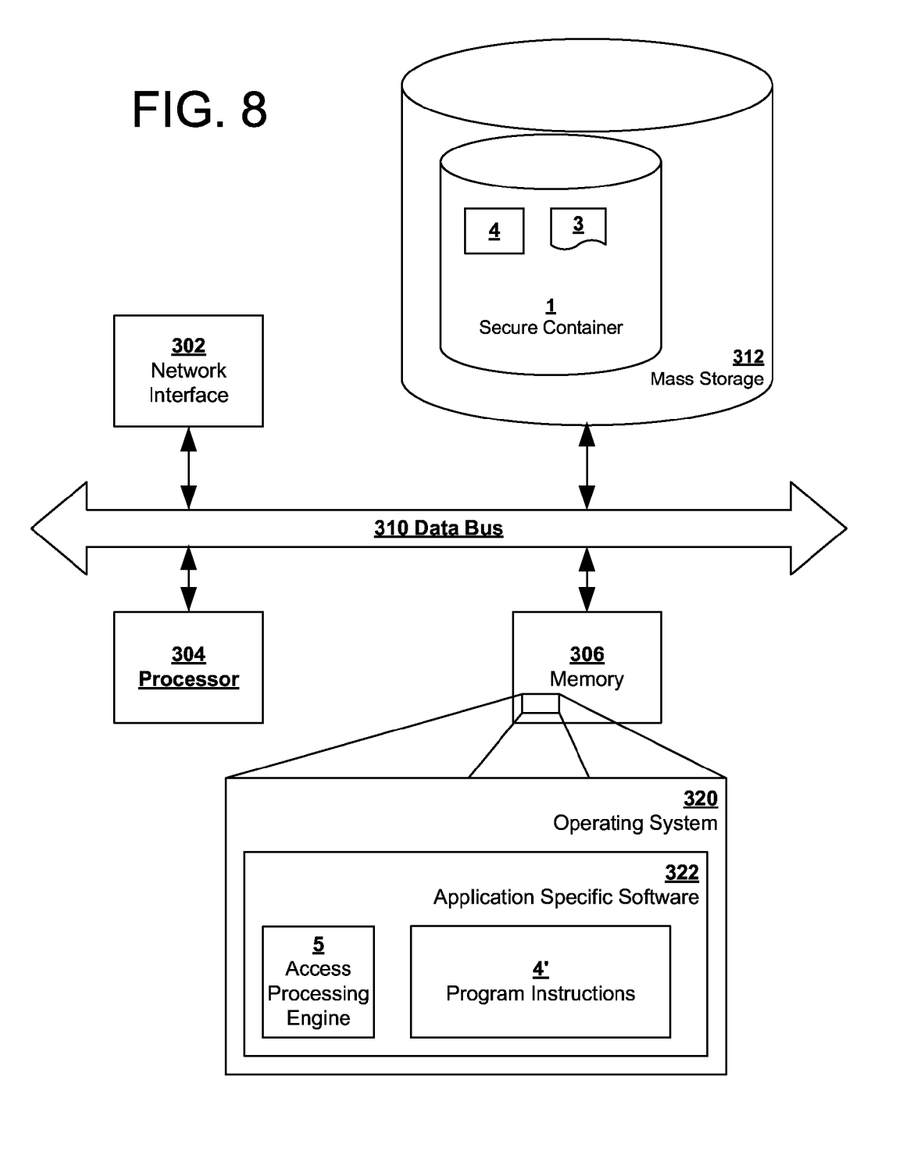
FIG. 8 depicts an embodiment of a user device equipped with piracy prevention, usage control and a distribution system.

FIG. 8 shows an embodiment of a user device (20) equipped with piracy prevention, usage control and a distribution system. Generally, user device (20) comprises network interface (302), processor (304), memory (306) and optionally mass storage (312) which all communicate using one or more data buses (310), which can include internal data buses, external serial buses, universal serial bus (USB), Peripheral Component Interconnect (PCI) bus, Serial Advanced Technology Attachment (SATA), external SATA (eSATA), etc.

Network interface (302) is used to couple user device (20) to remote services (21) or to other user devices (e.g., user device (20')). Network interface (302) can be embodied as a network interface card (NIC), network adapter, etc. Network interface (302) can be configured to carry data using the internet protocol (IP) with transmission control protocol (TCP) or user datagram protocol (UDP) and can be based on any number of data link protocols including but not limited to Ethernet, Point-to-Point Protocol (PPP), High-Level Data Link Control (HDLC) and Advanced Data Communication Control Protocol (ADCCP).

Mass storage (312) can comprise any number of storage media including but not limited to a hard disk drive, solid state drive, flash memory, and or optical storage media. Mass storage (312) can be used to house secure container (1). In addition, mass storage (312) is used to supplement memory (306) and is often configured with files in a file system, but may also provide storage for virtual memory as an extension of memory (306). In one embodiment, mass storage (312) can also include cryptographic hardware so that the cryptographic of secure container (1) is implemented in part or entirely in hardware.

Processor (304) can be any device for executing instructions, particularly instructions stored in memory (306). Processor (306) can comprise any commercially available processor such as a central processor unit (CPU), floating-point processor unit (FPU), graphics processing unit (GPU), a multicore processor, a microprocessor (either in the form of a microchip or chip set), a macroprocessor, or generally any device for executing software instructions. In addition, processor (306) can comprise a custom made processing device such as one made from a programmable logic array (PLA), field programmable gate array (FPGA), application specific integrated circuit (ASIC), solution on a chip (SOC), or combinations thereof.

Memory (306) can comprise any one or combination of volatile memory elements such as random access memory (RAM) (for example, dynamic RAM (DRAM), static RAM (SRAM), synchronous dynamic RAM (SDRAM), double data rate (DDR) RAM, etc. and/or nonvolatile memory elements such as read only memory (ROM), flash memory, hard drive, tape, optical media, etc.). In addition, memory (306) can comprise various components such as program memory for storing processor instructions, data memory for storing data used by the processor (304), and/or various levels of caches. It should be noted that mass storage (312) and memory (306) can share much of the same functionality, for example, program instructions can be stored both in mass storage (312) and read into memory (306) as the processor executes the program instructions. Therefore, one of ordinary skill in the art should note that though described separately in this embodiment, memory (306) can perform any function described for mass storage (312).

Furthermore, protected program instructions (4) as well as associated content can be loaded from the secure container (1) which resides on mass storage (312) into memory (306) where processor (304) can execute protected program instructions (4') while resident in memory (306).

The software in memory (306) can include one or more separate programs, each of which includes an ordered listing of executable instructions for implementing logical functions. Typically, the software in memory (306) may initially be stored in mass storage (312), read into memory (306) for execution by processor (304) and can include operating system (320). Executing within the operating system is application specific software (322). It should be noted, however, that the modules within application specific software (322) can be implemented in software, hardware or a combination of software and hardware. In addition to controlling and executing application specific software (322), operating system (320) can be configured to manage hardware resources including but not limited to input-output control, file and data management, memory management, communications controls and provide software services including but not limited to controlling the execution of other computer programs, scheduling, and inter-process communications.

Application specific software (322) includes the access processing engine (5). Specifically, access processing engine (5) can facilitate retrieval of cryptographic keys (2) from remote services (21) through network interface (302), mirroring of secure container (1) with other containers on other user devices (e.g., container (1') on user device (7') also through network interface (302) and access control of secure container (1). Access processing engine (5) in order to control access of secure container (1) can create the secure container on encrypted mass storage or implement it as an encrypted virtual file system such as one using file system in userspace (FUSE).

The advantages of the present invention include, without limitation, the ability to control and limit usage of software and other arbitrary processing engines within a secure container, the ability to control and limit the access to data and organization of said data within a secure container, and to enact this control based on the data being accessed, the reason for access, the user requesting the access, and so forth.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A user device comprising:
a network interface, a processor, application specific software comprising an access processing engine, and memory;
a secure container comprising a binary executable program and data, wherein the binary executable program and data are encrypted in the secure container, wherein a user of the user device cannot read the binary executable program and cannot directly access the data, nor have access to a cryptographic key for decrypting the binary executable program or data; and
wherein the access processing engine controls execution of the binary executable program at the user device and allows the executed binary executable program to read the data in the secure container, in accordance with a set of rules from a rules management engine, by decrypting the binary executable program and the data in the secure container using one or more cryptographic keys, wherein the user of the user device does not have direct access to the one or more cryptographic keys, and wherein the user of the user device must use the access processing engine to access the data in the secure container or execute the binary executable program,
wherein the data is downloaded, via the network interface, and encrypted in the secure container by a cryptographic key.

2. The user device of claim 1, wherein the executed binary executable program is identified by a process identification number or a process handle.

3. The user device of claim 1, wherein the rules management engine is remote from the user device.

4. The user device of claim 1, wherein the one or more cryptographic keys are received from a key management engine, wherein the key management engine is remote from the user device.

5. The user device of claim 1, wherein the binary executable program does not include a copy prevention module.

6. The user device of claim 1, wherein the access processing engine grants a child process spawned by the executed binary executable program permission to access the data.

7. The user device of claim 1, wherein the data comprises protected media and the executed binary executable program implements a media player configured to display the protected media.

8. The user device of claim 1, wherein the data comprises a document and the executed binary executable program implements a document viewer configured to display the document.

9. The user device of claim 7, wherein the media player watermarks the protected media when played.

10. A method of piracy prevention and usage control, the method implemented on a user device, the method comprising steps of:
receiving, at the user device, a binary executable program;
downloading, at the user device, data;
storing, at the user device, the binary executable program and the data in a secure container, wherein the binary executable program and data are encrypted in the secure container, wherein a user of the user device cannot read the binary executable program and cannot directly access the data with a cryptographic key;
receiving, at the user device, rules received from a rules management engine;
executing, at the user device, application specific software comprising an access processing engine, wherein the access processing engine controls execution of the binary executable program at the user device and allows the executed binary executable program to read the data in the secure container in accordance with the rules received from a rules management engine; and
decrypting the binary executable program and the data in the secure container using one or more cryptographic keys, wherein the user of the user device does not have direct access to the one or more cryptographic keys and must use the access processing engine to access the data in the secure container or execute the binary program.

11. The method of claim 10, further comprising the step of:
receiving the one or more cryptographic keys from a key management engine.

12. The method of claim 10, wherein the binary executable program does not include a copy prevention module.

13. The method of claim 10, wherein the data comprises protected media and the executed binary executable program implements a media player configured to display the protected media.

14. The method of claim 10, wherein the data comprises a document and the executed binary executable program implements a document viewer configured to display the document.

15. The method of claim 10, wherein the binary executable program is received from a server remote from the user device.

16. The method of claim 10, wherein the binary executable program is received from another user device.

17. The method of claim 13, wherein the media player watermarks the protected media when played.

* * * * *